United States Patent
Elliott et al.

(10) Patent No.: US 9,446,745 B2
(45) Date of Patent: Sep. 20, 2016

(54) INTEGRATED ROTARY AND LINEAR SENSOR

(71) Applicant: KSR IP Holdings, LLC, Ridgetown (CA)

(72) Inventors: Ryan W. Elliott, Chatham (CA); Dan O'Neill, Chatham (CA); Lingmin Shao, Ridgetown (CA); Shaun Matthew Fuller, Ridgetown (CA); Jim Hartford, Blenheim (CA)

(73) Assignee: KSR IP Holdings, LLC, Wilmington, DE (US)

( * ) Notice: Subject to any disclaimer, the term of this patent is extended or adjusted under 35 U.S.C. 154(b) by 37 days.

(21) Appl. No.: 14/482,455

(22) Filed: Sep. 10, 2014

(65) Prior Publication Data
US 2015/0070003 A1 Mar. 12, 2015

Related U.S. Application Data

(60) Provisional application No. 62/036,892, filed on Aug. 13, 2014, provisional application No. 61/880,490, filed on Sep. 20, 2013, provisional application No. 61/875,883, filed on Sep. 10, 2013.

(51) Int. Cl.
| | |
|---|---|
| *G01D 5/14* | (2006.01) |
| *G01D 5/20* | (2006.01) |
| *B60T 7/04* | (2006.01) |
| *G01D 11/24* | (2006.01) |
| *G01D 21/02* | (2006.01) |

(52) U.S. Cl.
CPC .............. *B60T 7/042* (2013.01); *G01D 11/245* (2013.01); *G01D 21/02* (2013.01); *G01D 5/145* (2013.01); *G01D 5/20* (2013.01)

(58) Field of Classification Search
CPC ...... G01D 5/20; G01D 11/245; G01D 21/02; G01D 5/142; G01D 5/145; B60T 7/042
See application file for complete search history.

(56) References Cited

U.S. PATENT DOCUMENTS

| | | | | |
|---|---|---|---|---|
| 4,847,557 | A * | 7/1989 | Saito | G01P 1/026 174/522 |
| 5,506,502 | A | 4/1996 | Maennle | |
| 7,320,817 | B2 * | 1/2008 | Kotani | B29C 45/14065 174/521 |
| 7,466,125 | B2 * | 12/2008 | Heinze | G01D 5/145 324/207.21 |

(Continued)

FOREIGN PATENT DOCUMENTS

| | | |
|---|---|---|
| KR | 10-2004-0010938 | 7/2002 |
| KR | 10-0932444 B1 | 12/2009 |

*Primary Examiner* — Jay Patidar
(74) *Attorney, Agent, or Firm* — Dinsmore & Shohl LLP

(57) ABSTRACT

A sensor assembly for a vehicle electronic braking system including a housing, at least one linear sensor, the at least one sensor contained within the housing, the linear sensor adapted to measure the linear distance traveled of a brake pedal. The assembly further includes a rotary sensor, the rotary sensor also contained within the same housing, the rotary sensor adapted to measure rotary motion of a DC motor in an the electronic braking system. The rotary sensor and the at least one linear sensor each in communication with a brake control unit. The at least one linear sensor and the at least one rotary sensor is encapsulated, either together or separately. The at least one linear sensor is a Hall-effect sensor. A wake up switch circuit is integrated with at least one of the linear sensors to wake up the system when the driver depresses the brake pedal in the electronic braking system. The rotary sensor is an inductive sensor.

20 Claims, 9 Drawing Sheets

(56) References Cited

U.S. PATENT DOCUMENTS

| | | | |
|---|---|---|---|
| 7,612,555 B2* | 11/2009 | Dietzel | G01D 5/145 324/207.21 |
| 8,004,277 B2* | 8/2011 | Patil | B62D 15/0215 324/207.25 |
| 2003/0080706 A1 | 5/2003 | Waite | |
| 2004/0095131 A1* | 5/2004 | Withanawasam | G01D 5/145 324/207.21 |
| 2006/0244439 A1* | 11/2006 | Fukuoka | G01P 1/026 324/207.2 |
| 2011/0066356 A1* | 3/2011 | Ogura | G01D 5/145 701/103 |
| 2012/0056739 A1 | 3/2012 | Lee et al. | |

* cited by examiner

1

INTEGRATED ROTARY AND LINEAR SENSOR

CROSS-REFERENCE TO RELATED APPLICATIONS

This utility patent application claims priority from U.S. provisional patent application Ser. No. 61/875,883, filed Sep. 10, 2013, the entire contents of which is incorporated herein in its entirety and from U.S. provisional patent application Ser. No. 61/880,490, filed Sep. 20, 2013, the entire contents of which is incorporated herein in its entirety and from U.S. provisional patent application Ser. No. 62/036,892, filed Aug. 13, 2014, the entire contents of which is incorporated herein in its entirety

FIELD OF THE INVENTION

The present invention relates generally to sensors. More particularly, this invention relates to sensors for use with automotive braking systems.

BACKGROUND OF THE INVENTION

Sensors are commonly used in the art of pedal control to measure properties such as rotation. These sensors are typically mounted to the rotation point within a pedal assembly to measure rotation of the pedal. These sensors utilize Hall Effect or other known principles to measure travel and displacement. The sensor module includes separate sensor types such as Hall Effect or inductive. It is not known to combine a rotary sensor with a linear sensor together within an electronic braking system. Furthermore, it is not known to combine a rotary sensor with a linear sensor within the same apparatus so as to minimize parts, weight, and cost of production. As such, it would be advantageous to provide a sensor assembly including those rotary and linear sensors used in connection with an electronic braking system. Further, it would be advantageous to include both Hall-effect and inductive sensors utilizing the benefits of each to achieve best system performance and packaging constraints imposed by the customers.

SUMMARY OF THE INVENTION

A sensor assembly is provided having a rotary sensor combined with linear sensors into one sensor assembly. The sensors are mounted together and encapsulated with an over mold material. The rotary sensor of the present invention (inductive) is operable to measure the rotary motion of a DC motor in an electronic braking system. Two independent linear sensors (Hall-effect) are operable to measure the brake booster travel, or the linear distance of brake pedal travel, in an electronic braking system. Furthermore, a wake-up switch circuit is integrated with one of the linear sensors to "wake up" the system when the driver depresses the pedal in the electronic braking system. This switch is typically activated upon first depression of the pedal when the user first begins to operate the vehicle. The sensor module includes separate sensor types such as Hall Effect or inductive. The present invention includes both Hall-effect and inductive sensors utilizing the benefits of each to achieve best system performance.

A sensor assembly for a vehicle electronic braking system including a housing, at least one linear sensor, the at least one sensor contained within the housing, the linear sensor adapted to measure the linear distance traveled of a brake pedal. The assembly further includes a rotary sensor, the rotary sensor also contained within the same housing, the rotary sensor adapted to measure rotary motion of a DC motor in an the electronic braking system. The rotary sensor and the at least one linear sensor each in communication with a brake control unit. The housing is overmolded over both the at least one linear sensor and the rotary sensor. The at least one linear sensor and the at least one rotary sensor are encapsulated within the housing. The at least one linear sensor is a Hall-effect sensor. A wake up switch circuit is integrated with at least one of the linear sensors to wake up the system when the driver depresses the brake pedal in the electronic braking system. The rotary sensor is an inductive sensor.

A sensor assembly for a vehicle electronic braking system having at least one linear sensor, the at least one linear sensor encapsulated by an encapsulation material. The linear sensor is adapted to measure the linear distance traveled of a brake pedal. A rotary is provided connected to the at least one linear sensor, the rotary sensor also encapsulated by the same encapsulation material, the rotary sensor adapted to measure rotary motion of a DC motor in the electronic braking system. The rotary sensor and the at least one linear sensor each in communication with a brake control unit. The at least one linear sensor is a Hall-effect sensor, the linear sensor further includes a PCB. A wake up switch circuit is integrated with at least one of the linear sensors to wake up the system when the driver depresses the brake pedal in the electronic braking system. The rotary sensor is an inductive sensor. The linear sensor includes at least one magnet operable to measure travel of push rod connected to a pedal. The magnets are mounted to a PCB. The linear sensor connects to the brake pedal by means of a magnet. A wake up switch is provided connected to the at least one linear sensor to wake up the system when the driver depresses the pedal.

A sensor assembly for a vehicle electronic braking system having a housing, at least one linear sensor connected to the housing, the at least one linear sensor encapsulated by an encapsulation material, the linear sensor adapted to measure the linear distance traveled of a brake pedal and a rotary sensor also connected to the housing, the rotary sensor spaced apart from the at least one linear sensor, the rotary sensor also encapsulated by a separate encapsulation material, the rotary sensor adapted to measure rotary motion of a DC motor in an the electronic braking system wherein the rotary sensor and the at least one linear sensor each in communication with a brake control unit. The housing is overmolded over both the at least one linear sensor and the rotary sensor. The at least one linear sensor and the at least one rotary sensor are encapsulated within the housing. The at least one linear sensor is a Hall-effect sensor. A wake up switch circuit is integrated with at least one of the linear sensors to wake up the system when the driver depresses the brake pedal in the electronic braking system. The rotary sensor is an inductive sensor. The linear sensor includes at least one magnet operable to measure travel of push rod connected to a pedal. The magnets are mounted to a PCB. The linear sensor connects to the brake pedal by means of a magnet. A wake up switch is provided connected to the at least one linear sensor to wake up the system when the driver depresses the pedal.

DETAILED DESCRIPTION OF THE INVENTION

The present invention provides for a rotary sensor combined with linear sensors into one sensor assembly to assist in packaging (to have the sensor assembly all contained together). The configuration also allows for the entire sensor assembly to be fully encapsulated by the encapsulation material. The encapsulation material assist in protecting the sensors for damage, dust, water . . . etc. and other environmental factors. The encapsulation material may also reduce noise. The sensor assembly fully assembled with the encapsulation material provides for a finished package ready for assembly provided to the customer and/or manufacturer. The sensors are mounted together and encapsulated with an over mold material. The rotary sensor of the present invention (inductive) is operable to measure the rotary motion of a DC motor in an electronic braking system. Two independent linear sensors (Hall-effect) are operable to measure the brake booster travel, or the linear distance of brake pedal travel, in an electronic braking system. Furthermore, a wake-up switch circuit is integrated with one of the linear sensors to "wake up" the system when the driver depresses the pedal in the electronic braking system. This switch is typically activated upon first depression of the pedal when the user first begins to operate the vehicle. The sensor module includes separate sensor types such as Hall effect or inductive. The present invention includes both Hall-effect and inductive sensors utilizing the benefits of each to achieve best system performance.

Figure 1:
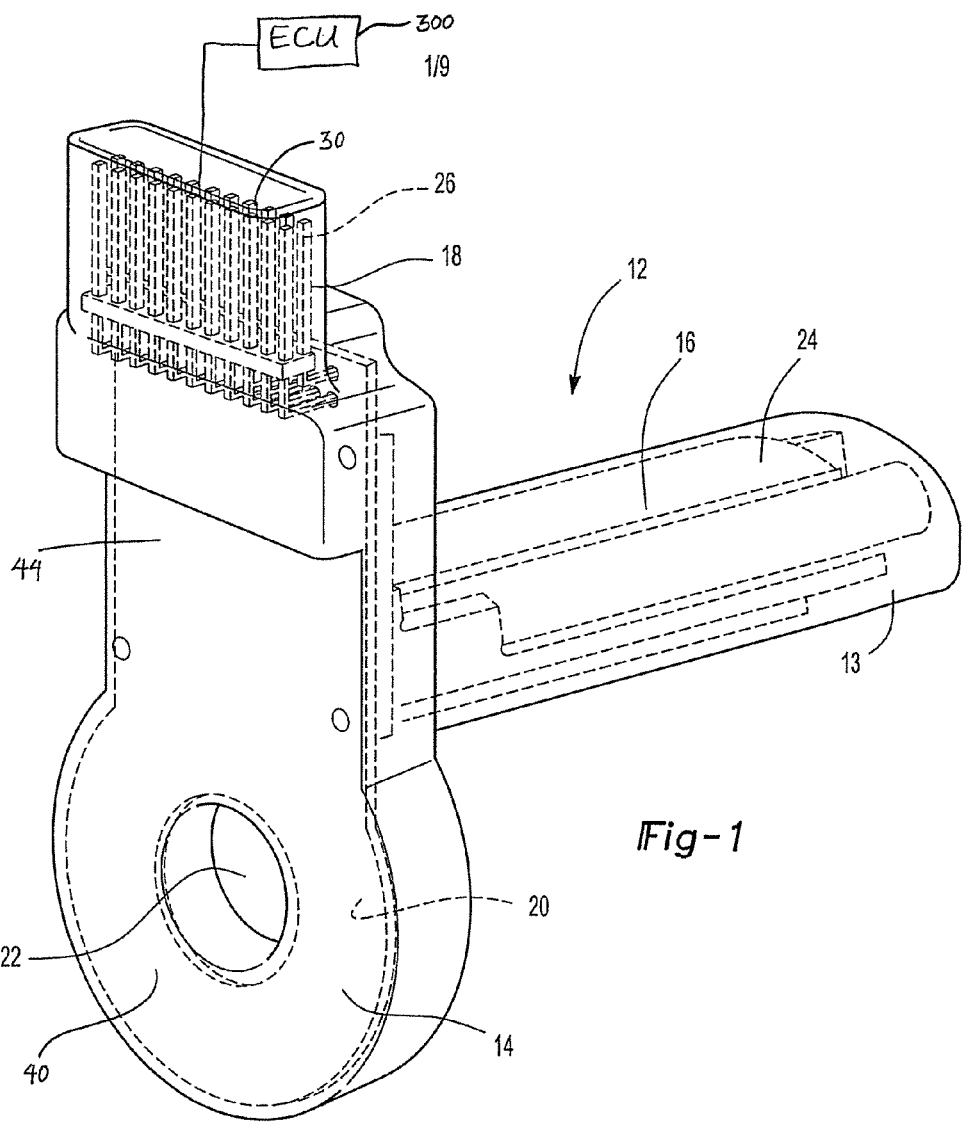
FIG. 1 illustrates a perspective view of the sensors contained within encapsulation material of the first embodiment.

FIG. 1 illustrates a perspective view of the encapsulation material 13 provided over a sensor assembly 12. The encapsulation material 13 as shown in FIG. 1 is molded over the sensor assembly 12. The encapsulation material 13 includes a rotary portion 14 and a linear portion 16. A plug portion 18 is further provided to connect the sensors to an electronic control unit or other computer or processor. The sensor assembly 12 includes a rotary sensor 20. The rotary sensor 20 is provided encapsulated within the rotary portion 14 of the encapsulation material 13. The rotary sensor 20 includes a circular portion 40 having an aperture 22. The rotary sensor 20 includes an upper planar portion 44 adapted to connect to the linear sensor 24. A plurality of apertures 44 are provided allowing the linear sensor to connect to the rotary sensor at the upper planar portion 44.

A terminal block 26 is connected to the upper end of the rotary sensor 20. The terminal block 26 is a 22-pin 30 terminal block which is operable to connect to the vehicle electronic control unit. The terminal block 26 is encapsulated with the encapsulation material 13 at the terminal block portion 18 of the encapsulation material. The pins 30 are operable to connect to a female connector portion to connect directly to the electronic control unit (not shown).

The linear sensor 24 is provided encapsulated within the linear portion 16 of the encapsulation material 13. The linear sensor 24 extends generally perpendicular to and away from the rotary sensor 20. The linear sensor 24 includes the sensor portion 54 including the terminal pin area 54. The terminal pin area 54 is operable to connect the linear circuits and wake-up circuits to the rotary sensor 20 and the terminal block 26. The linear sensor and PCB 52 further includes two Hall Effect chips 56 for linear sensing. The PCB 52 further includes a wake-up circuit (not shown). The PCB 52 is mounted below the linear sensor assembly 20.

Figure 2:
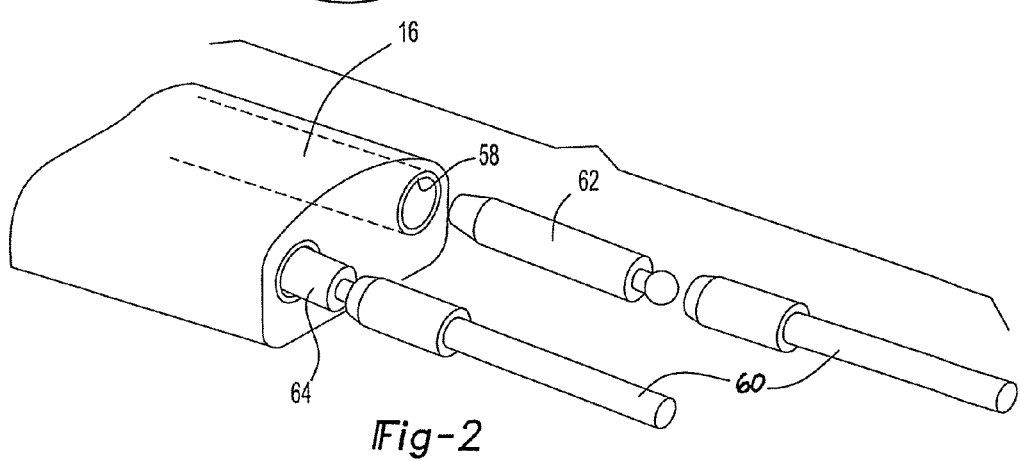
FIG. 2 illustrates a perspective view of the linear sensors and pushrods in an exploded form.
Figure 3:
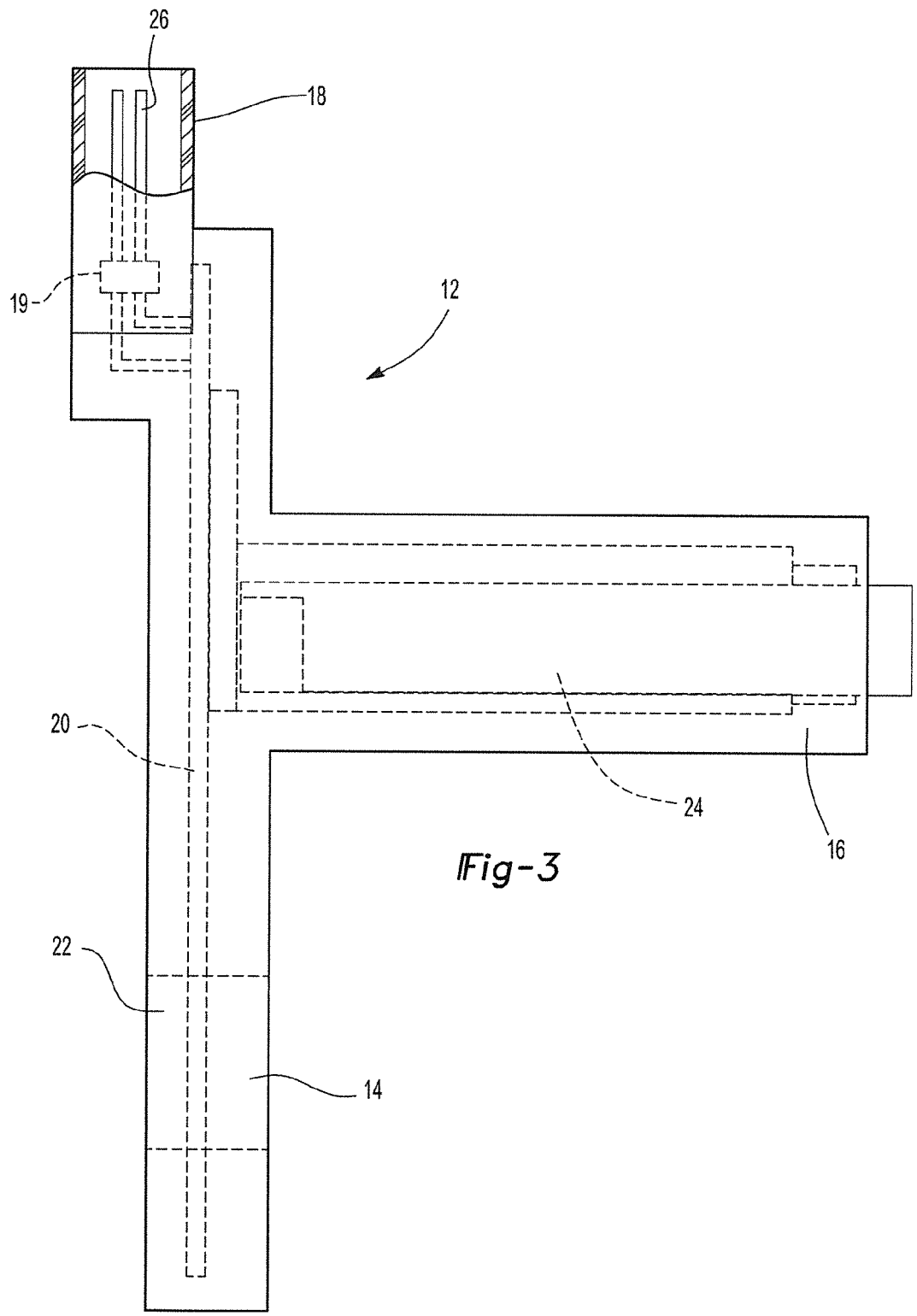
FIG. 3 illustrates a side and partial cross-sectional view of a first embodiment of the sensor assembly.
Figure 4:
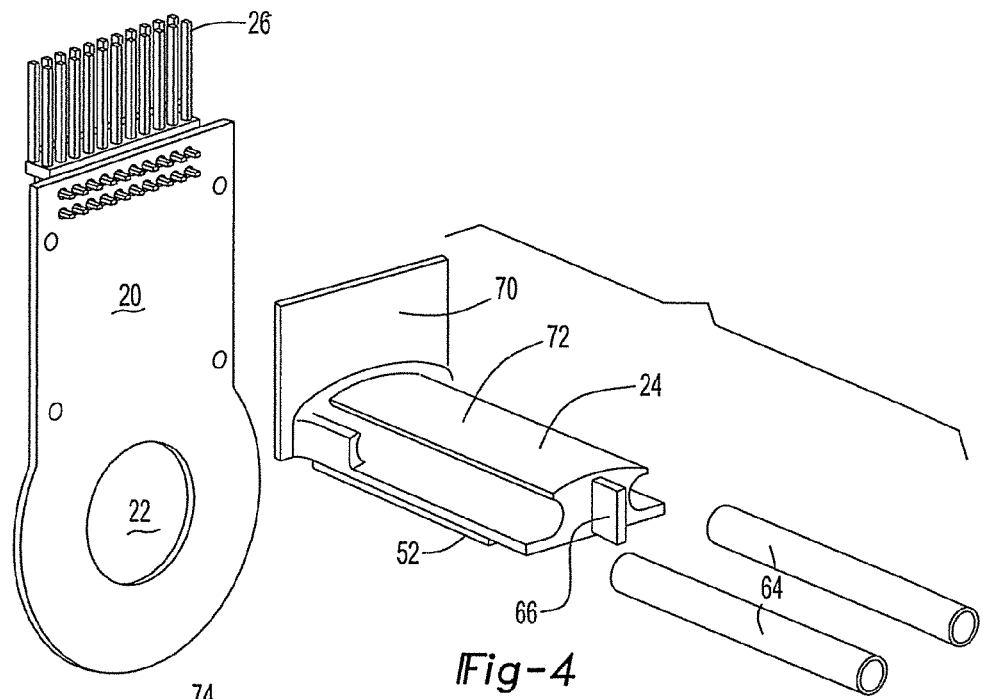
FIG. 4 illustrates an exploded perspective view of the sensor assembly of the first embodiment.
Figure 14:
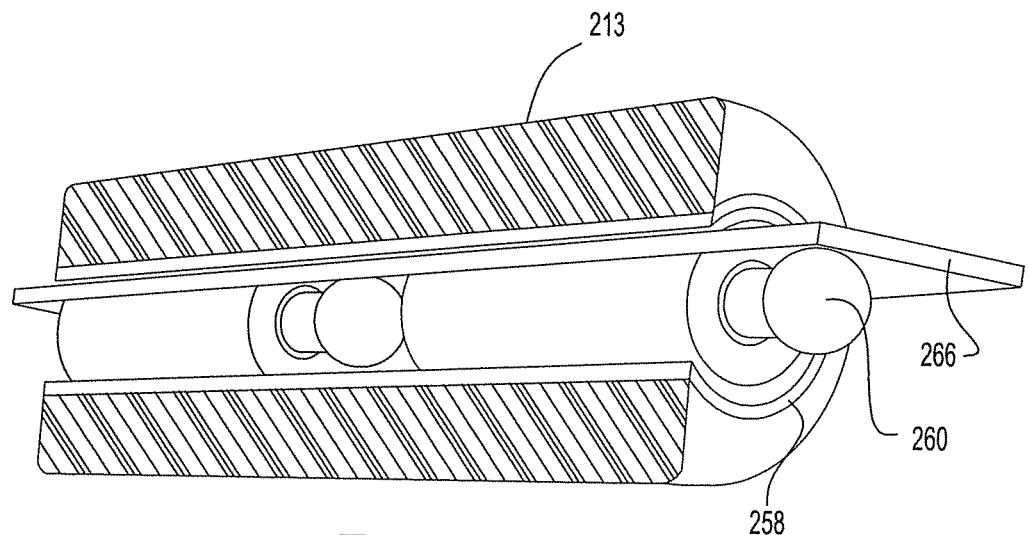
FIG. 14 illustrates a cross-sectional perspective view of the linear sensor of the third embodiment of the sensor assembly of the present invention.

FIG. 2 illustrate the assembly of the linear sensor 20. The linear sensor 20 includes apertures 58 within the encapsulation material 13. Linear tubes 64 are provided within the apertures 58. Push rods 60 and magnets 62 are provided inserted within the linear tubes 64. The linear tubes 64 and a generally planar shield 66 are over molded into a plastic portion 72 as shown in FIG. 14. The linear tubes 64 are pressed into the over molded plastic portion 72. The PCB 52 is mounted below the linear tubes 64 and below the over molded plastic portion 72. As the push rods 60 and the magnets 62 are moved in and out of the linear tubes 64 (such as when connected to a brake pedal), the linear distance of the brake pedal system is measured as the magnets 62 and push rods 60 move within the linear tubes 64 and are sensed by the PCB 52 and the Hall effect chips 64. This information is transmitted through the terminal block 26 and to the electronic control unit for processing.

Figure 5:
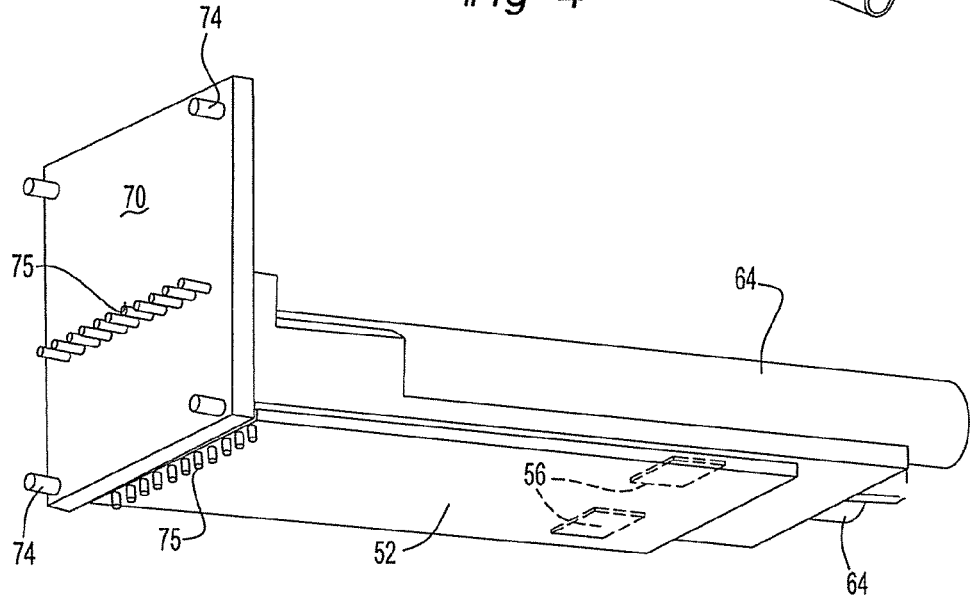
FIG. 5 illustrates a lower perspective view of a portion of the sensor assembly without the rotary sensor.
Figure 16:
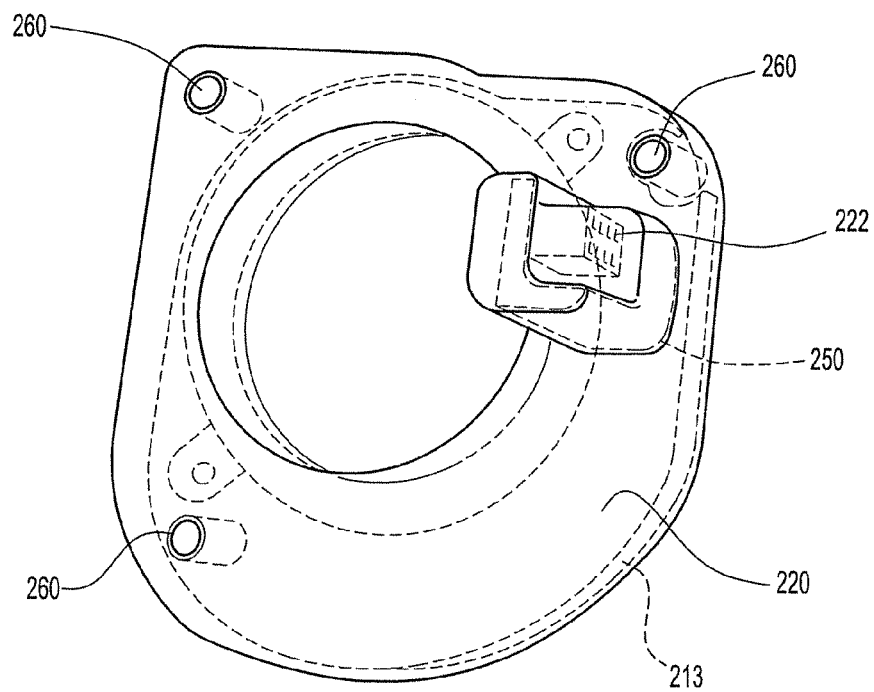
FIG. 16 illustrates perspective view of the rotary sensor of the third embodiment of the sensor assembly of the present invention.

FIG. 5 illustrates how the linear sensor 24 is connected to the rotary sensor 20. A connector board 70 (the connector board may also be part of the over molded portion 72) is provided connected to the linear sensor 24 at a position generally perpendicular to the linear tubes 64. The connector board 70 may optionally be welded (or attached via screws or other fasteners) to the linear sensor 24. In the present embodiment, the linear sensor 24 is soldered to the rotary sensor 20. This connection is illustrated in FIG. 16. In alternative embodiments, the components are connected via pins or heat staked together.

Figure 6:
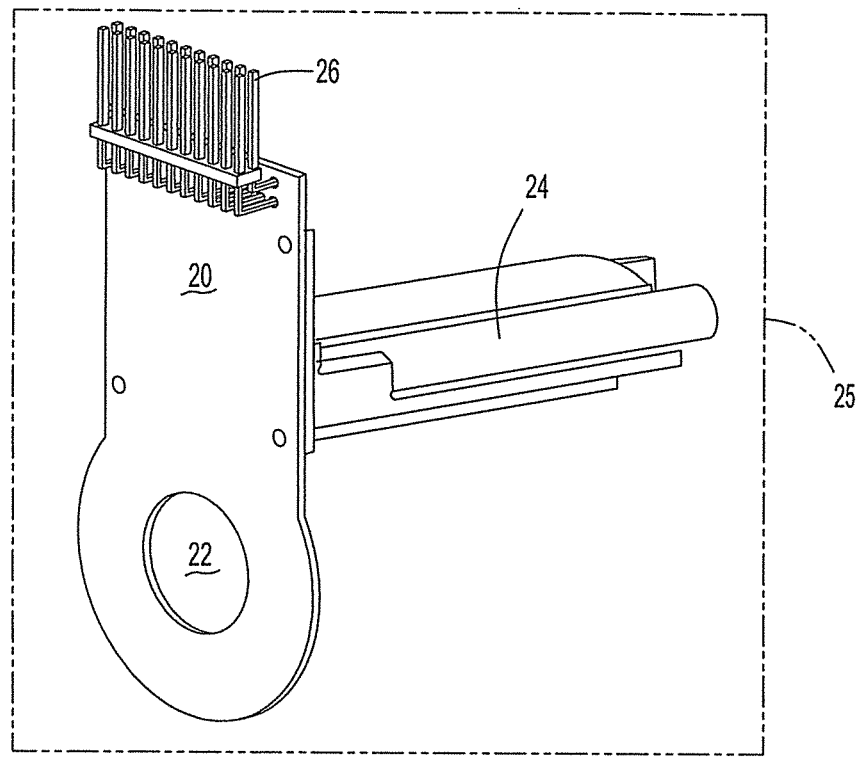
FIG. 6 illustrates a perspective view of the sensor assembly of the present invention with encapsulation material.
Figure 7:
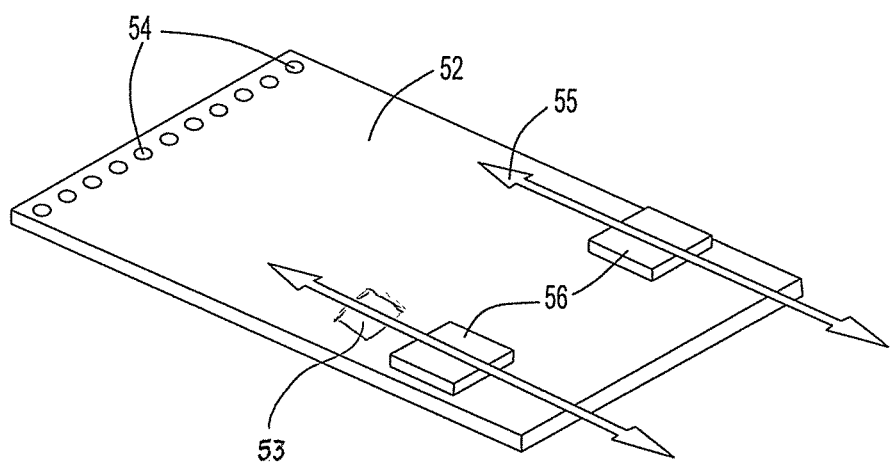
FIG. 7 illustrates a perspective view PCB and magnets of the sensor assembly with directional arrows illustrating the movement of the push-rods.
Figure 8:
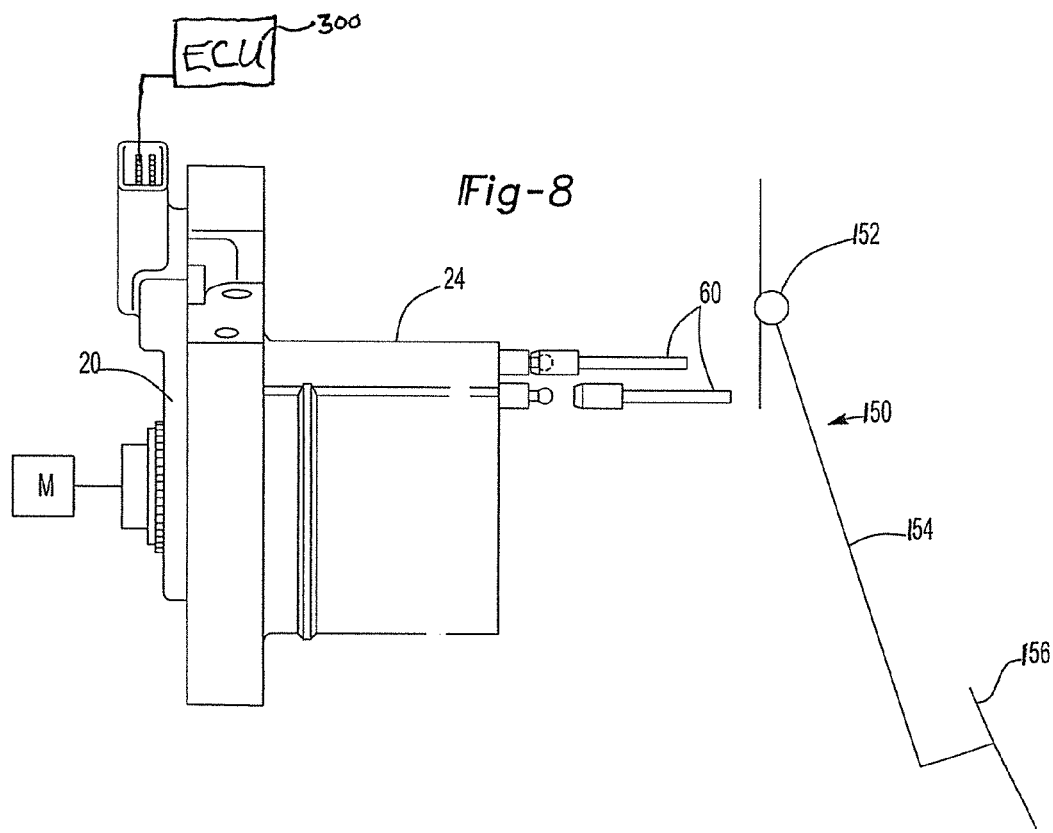
FIG. 8 illustrates a perspective view of the environment of the sensor assembly where the sensor assembly is connected to a DC motor and a brake pedal.

FIG. 6 illustrates the sensor assembly 12 before encapsulation having a theoretical encapsulation material 25 provided around the assembly. The encapsulation material may also be provided over the linear sensor and the rotary sensor separately and attached to a separate housing. After the sensor assembly 12 is connected together, an encapsulation material 13 fully seals all electronic components together. The encapsulation material around the sensor assembly 12 results in a net final shape which includes a connector in addition to joining the multiple Sensors and providing sealing of the electrical components. The entire sensor assembly 12 is encapsulated and molded to a shape with a thermoset material in a low pressure molding process. The main connector or terminal block portion 18 of the encapsulation material 13 is formed with a low pressure mold process. The encapsulation material 13 prevents damage to the sensor assembly 10 and further protects the sensor assembly 12 from environmental conditions such as moisture, dust, and other contaminants.

Figure 9:
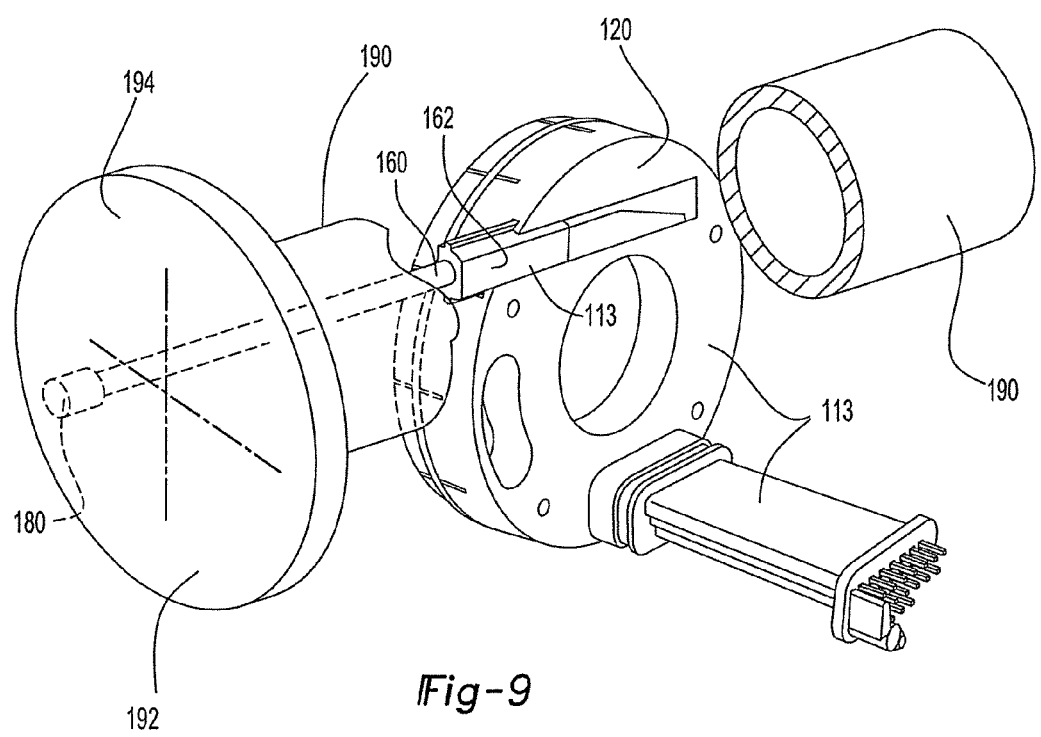
FIG. 9 illustrates a perspective view of a second embodiment of the sensor assembly.
Figure 10:
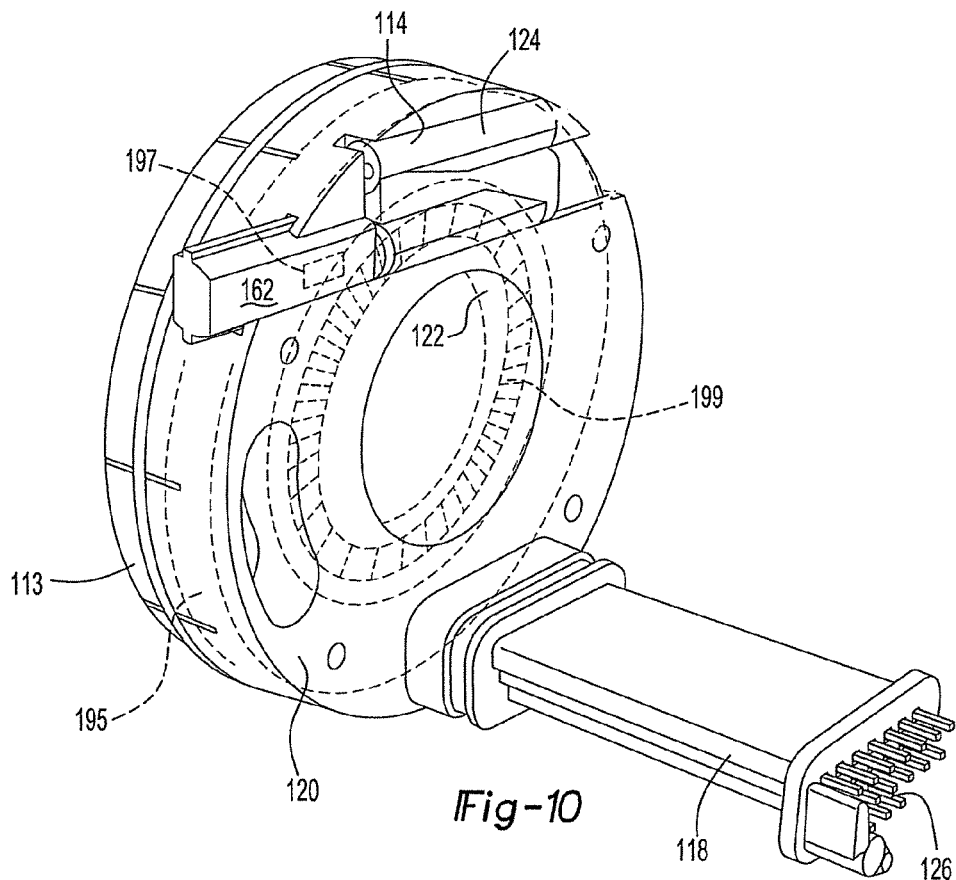
FIG. 10 illustrates an alternative perspective view of a second embodiment of the sensor assembly of the present invention with the encapsulation material.
Figure 11:
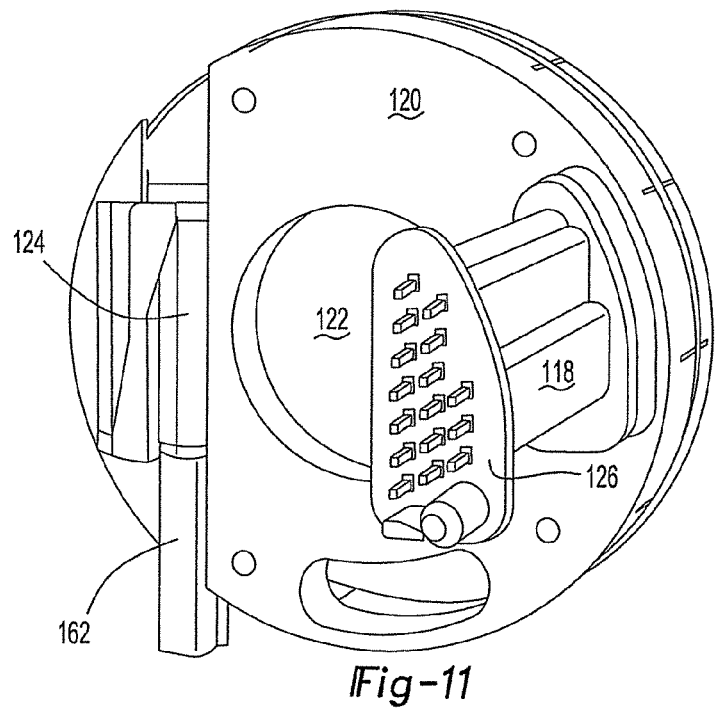
FIG. 11 illustrates an alternative perspective view of a second embodiment of the sensor assembly of the present invention without the encapsulation material.

The second embodiments of the present embodiments is illustrated in FIGS. 9-11. This second embodiments is similar in structure as compared to the first embodiment as described above, except only one PCB is required. As shown in the first FIGS. 1-8, 2 printed circuit boards are provided. The second embodiment of the present inventions provides only one printed circuit board (PCB) 195. The Hall effect chip 197 (in communication with the magnet 162 as the magnet moves linearly to measure linear travel) and the inductive sensor 199 (operable to measure rotary motion of a DC motor) are both connected to the PRC 195. This second embodiment provides for a rotary sensor combined with linear sensors into one sensor assembly. The sensors are mounted together and encapsulated with an over mold material. The rotary sensor of the present invention (inductive) is operable to measure the rotary motion of a DC motor in an electronic braking system. Two independent linear sensors (Hall-effect) are operable to measure the brake booster travel, or the linear distance of brake pedal travel, in an electronic braking system. Furthermore, a wake-up switch circuit 53 is integrated with one of the linear sensors to "wake up" the system when the driver depresses the pedal in the electronic braking system. This switch is typically activated upon first depression of the pedal when the user first begins to operate the vehicle. The present invention includes both Hall-effect and inductive sensors utilizing the benefits of each to achieve best system performance.

FIGS. 9, 10 and 11 illustrates a perspective view of the encapsulation material 13 provided over a sensor assembly. The material will be a thermoset that is either polyester or epoxy based. The advantages are that the entire product including connector and any inserts including the tubes can be molded in one shot which gives a final product. Also the entire sensor assembly will be completely sealed and electronics covered.

The encapsulation material 113 as shown in FIGS. 9, 10 and 11 is molded over the sensor assembly. The encapsulation material 113 includes a rotary portion 120 and a linear portion 114.

A plug portion 118 is further provided to connect the sensors to an electronic control unit or other computer or processor. The sensor assembly includes a rotary sensor 120. The rotary sensor 120 is provided encapsulated within the rotary portion of the encapsulation material 113. The rotary sensor 120 includes a circular portion having an aperture 122. The rotary sensor 120 includes portion adapted to connect to the linear sensor 114. A plurality of apertures are provided allowing the linear sensor to connect to the rotary sensor at the portion or the portion sensor.

A terminal block 126 is connected to the rotary sensor 120. The terminal block 126 is a 22-pin 30 terminal block which is operable to connect to the vehicle electronic control unit. The terminal block 126 is encapsulated with the encapsulation material 113 at the terminal block portion 118 of the encapsulation material. The pins are operable to connect to a female connector portion to connect directly to the electronic control unit (not shown).

The linear sensor 114 is provided encapsulated within the linear portion 114 of the encapsulation material 113. The linear sensor 114 extends generally perpendicular to and away from the rotary sensor 120. The linear sensor 114 includes the sensor portion including the terminal pin area. The terminal pin area is operable to connect the linear circuits and wake-up circuits to the rotary sensor 120 and the terminal block 126. The linear sensor and PCB further includes two Hall effect chips for linear sensing. The PCB further includes a wake-up circuit (not shown). The PCB is mounted below the linear sensor assembly 120.

FIGS. 9, 10 and 11 illustrate the assembly of the linear sensor 120. The linear sensor 120 includes apertures within the encapsulation material 113. Linear tubes are provided within the apertures. Push rods 160 and magnets are provided inserted within the linear tubes. The linear tubes and a generally planar shield are over molded into a plastic portion as shown in FIGS. 9, 10 and 11. The linear tubes are pressed into the over molded plastic portion. The PCB is mounted below the linear tubes and below the over molded plastic portion. As the push rods 160 and the magnets are moved in and out of the linear tubes (such as when connected to a brake pedal), the linear distance of the brake pedal system is measured as the magnets 62 and push rods 60 move within the linear tubes 64 and are sensed by the PCB and the Hall effect chips. This information is transmitted through the terminal block 216 and to the electronic control unit for processing.

FIG. 11 illustrates the sensor assembly before encapsulation. After the sensor assembly is connected together, an encapsulation material 113 fully seals all electronic components together. The encapsulation material around the sensor assembly 12 results in a net final shape which includes the connector in addition to joining the multiple Sensors and providing sealing of the electrical components. The entire sensor assembly is encapsulated and molded to a shape with a thermoset material in a low pressure molding process. The main connector or terminal block portion of the encapsulation material 113 is formed with a low pressure mold process. The encapsulation material 113 prevents damage to the sensor assembly and further protects the sensor assembly from environmental conditions such as moisture, dust, and other contaminants.

Figure 12:
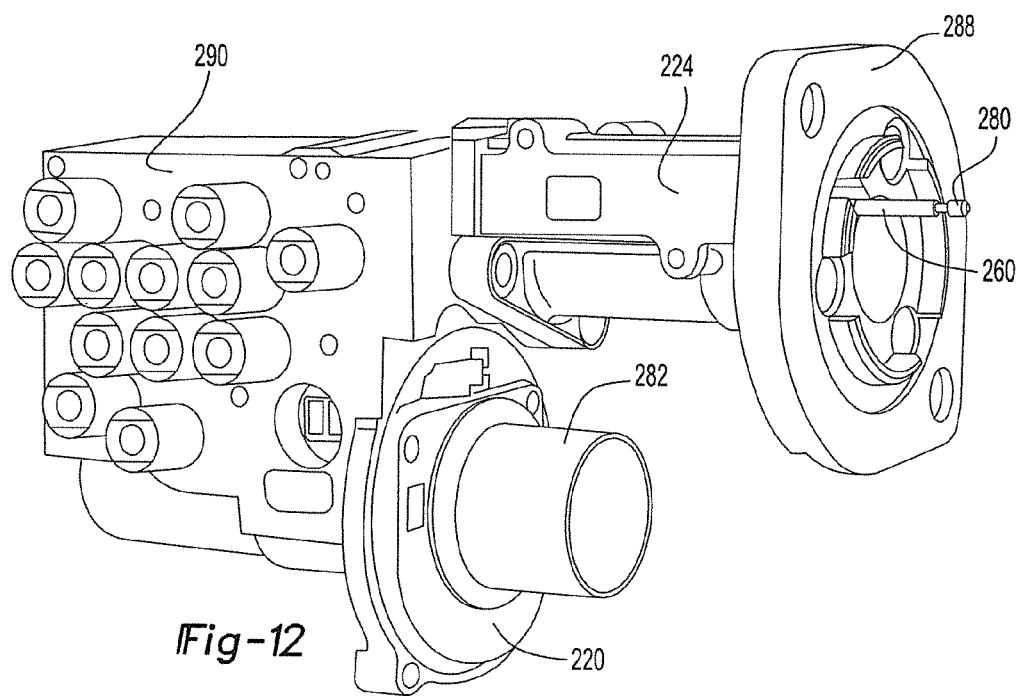
FIG. 12 illustrates a perspective view of a third embodiment of the sensor assembly of the present invention.
Figure 15:
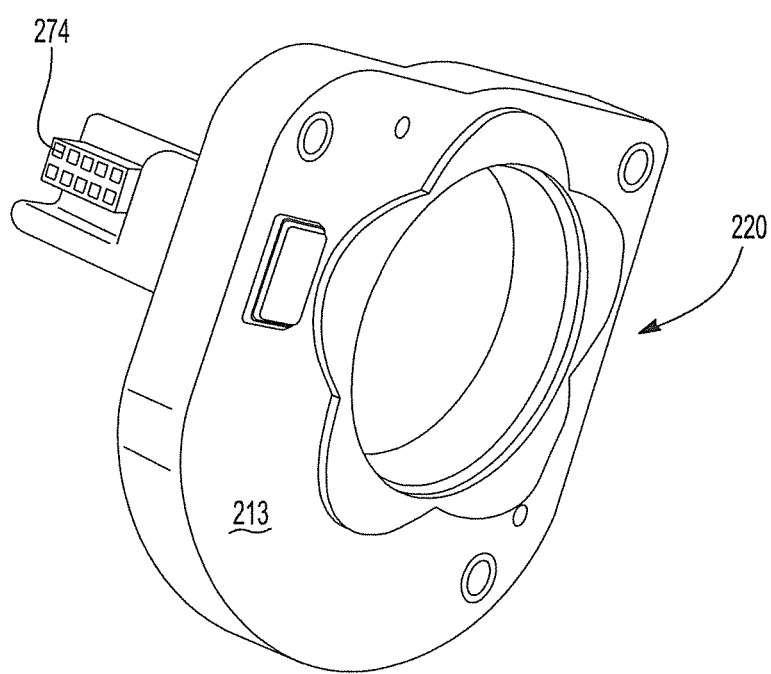
FIG. 15 illustrates perspective view of the rotary sensor of the third embodiment of the sensor assembly of the present invention with encapsulation material.

A third embodiment of the invention is shown in FIGS. 12-16. In the third embodiment the rotary and linear sensors are separated into a rotary sensor module and to a linear sensor module in order to accomplish packaging requirements. The rotary sensor module is shown in FIGS. 15 and 16. The completed module is shown in FIG. 12 and includes a circular plastic ring portion for supporting the coils of an induction type sensor. A PCB board is heat staked to a female terminal pin block connector. The terminal block connector is connected to the ring and extends outwardly from the ring at a 90 degree angle. The terminal block is connected to the coils by pins. A connector block for connection to the ECU 290 is mounted at the other end of the PCB. The housing has three throughbores 260 formed for mounting housing to the integrated brake control. The entire ring, coil, terminal, PCB and connector block are over molded with encapsulation material to be enclosed within a housing as a single unit as shown in FIG. 12. As above, the rotary sensor measures the rotary motion of a DC motor which a portion of rotates within the center aperture of the housing module. In the present embodiment the linear sensor 224 and separated and spaced apart from the rotary sensor 220, but connected together by a housing. Each of the linear sensor 224 and the rotary sensor 220 each have an encapsulation mater 213 formed around each of the sensor. In an alternative embodiment, the whole housing and the sensors 220, 224 can have the encapsulation mater formed around.

Figure 13:
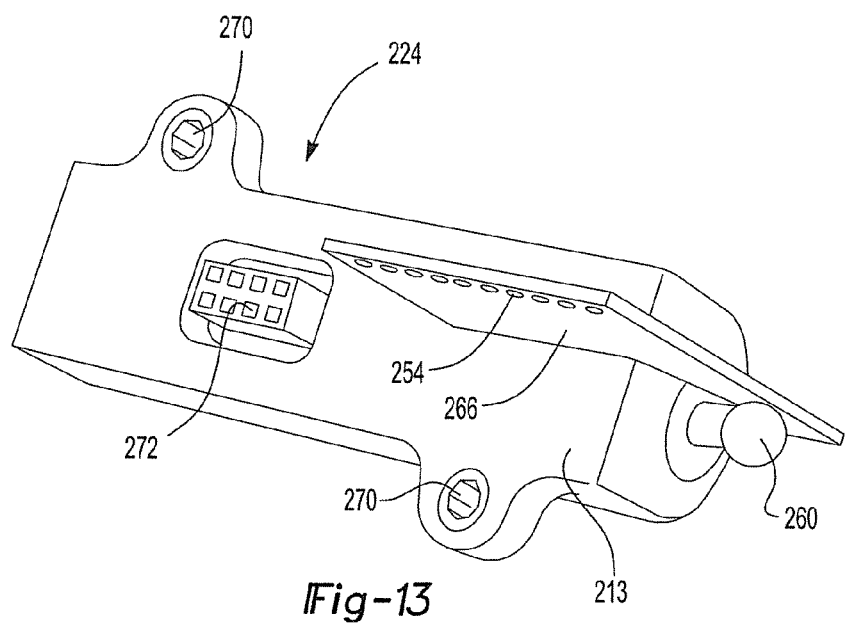
FIG. 13 illustrates a perspective view of the linear sensor of the third embodiment of the sensor assembly of the present invention.

As shown in FIGS. 13 and 14, a linear sensor 224 module includes a linear tube 258 which receives an over molded magnet which slides within the tube. The over molded magnet has an end with a ball 260 which is received in a cup formed in a push rod. The push rod is connected to the brake booster as before. A wake-up switch and ASIC producing two independent signals are mounted to a linear PCB board 266. The PCB board 266 is mounted to a plastic support which has a pair of end portions which extend outwardly to support the rigid tube. The rigid tube is pressed into the plastic support to form a singular assembly. This assembly together with a female connector for the ECU is placed in a mold and over molded with a thermoset encapsulation material. The encapsulation material forms a housing which has two ears which extend outwardly for receiving bushings for receiving fasteners which secure the linear module to the integrated brake control unit.

Both the rotary sensor module and the linear sensor module are electrically connected to the integrated brake control unit (i.e. ECU) via the connectors and mounted to the unit by fasteners. The modules work as before to provide fully enclosed sensor units. The sensors, as the same as above, send signals to the brake control unit.

Linear sensor assemblies as described above are used to detect the axial displacement of an input rod. The axial displacement may be used for processing a return function. For instance, it is known to use linear sensors in brake pedal applications. The input rod is operatively connected to the brake pedal, and the linear sensor measures the linear displacement of the input rod. The linear displacement is then processed by the vehicle to generate a corresponding brake function Such linear sensor assemblies include a sensor for detecting a target, a push rod, and a spring follower configured to connect the push rod to the input rod. The input rod includes a shaft and a radial flange disposed on a proximal end of the shaft. The flange includes an attachment feature for receiving one end of the spring follower. The other end of the spring follower is mounted to the distal end of the push rod. The target is mounted to an end of the push rod opposite the spring follower and displacement of the target is measured by the sensor.

However, the use of a spring follower increases the packaging size of the linear sensor assembly, requires the push rod to be attached to a specific location of the radial flange, and generates noise from the operation of the spring. Accordingly, it remains desirable to have a linear sensor assembly wherein the packaging size is reduced, greater tolerance is provided for attachment of the push rod to the input rod, and operating noise is reduced.

The linear sensor assemblies of the present invention are configured to detect the linear displacement of an input rod. The linear assembly provides for a fixed relationship between the input rod and a sensor target, wherein the fixed relationship between the sensor target and input rod is provided without the use of conventional spring followers so as to reduce the packaging dimensions of the assembly, reduce the noise associated with the operation of a spring, and increase positional tolerance as any available position of the input rod may be utilized as opposed to a fixed position with respect to traditional spring followers.

For illustrative purposes, the linear sensor is shown mounted to an input rod of a brake assembly. The input rod includes a radial flange disposed on a proximal end of the input rod. The radial flange is formed of a material having a magnetic field. The linear sensor assembly includes a sensor, a sensor target, and a push rod assembly. The push rod assembly includes a push rod and a housing configured to hold an attachment. Preferably, the attachment is a magnet so as to magnetically couple with the radial flange of the input rod. It should be appreciated that the use of a magnet allows the distal end of the push rod to be fixed to any space on the radial flange that is available within the packaging space provided. Thus the linear sensor assembly provides tolerance for packaging.

The target is mounted to an end of the push rod opposite the housing. The sensor is configured to detect the linear displacement of the target. Thus, linear displacement of the input rod may be measured by the sensor. Further, the use of the magnet eliminates the need for a spring follower and thus further reduces the packaging size of the sensor assembly itself relative to the current art. Further, noise from the use of a spring is eliminated.

Generally, a magnetic attachment 192 is used to constrain push rod on end of shaft. The system used magnetic attraction forces to push and pull the push rod and associated sensor target. The target must follow the position of the flange accurately as the motion is translated through the pushrod. The shaft 190 includes a target 192 having a surface 194. The surface 194 is ferrous so as to attract the magnetic attachment 180 connected to the push rod 160.

The magnetic attachment offers 180 benefits namely, packaging, tolerance and noise compared to a spring follower concept that is traditional. Packaging of the sensor assembly is greatly improved as there is no longer a spring assembly needed to push the sensor element back to the undepressed position. Positional tolerance concerns of matting surface of flange and the push rod as the magnet will attach to any spot as opposed to a mechanical connection (this is same as simple follower and spring to return).

Noise is greatly reduced as there is no spring with associate metal contact sounds that can be generated. The magnet to flange interface has no relative motion during application thus this is not a source of noise.

Figure 17:
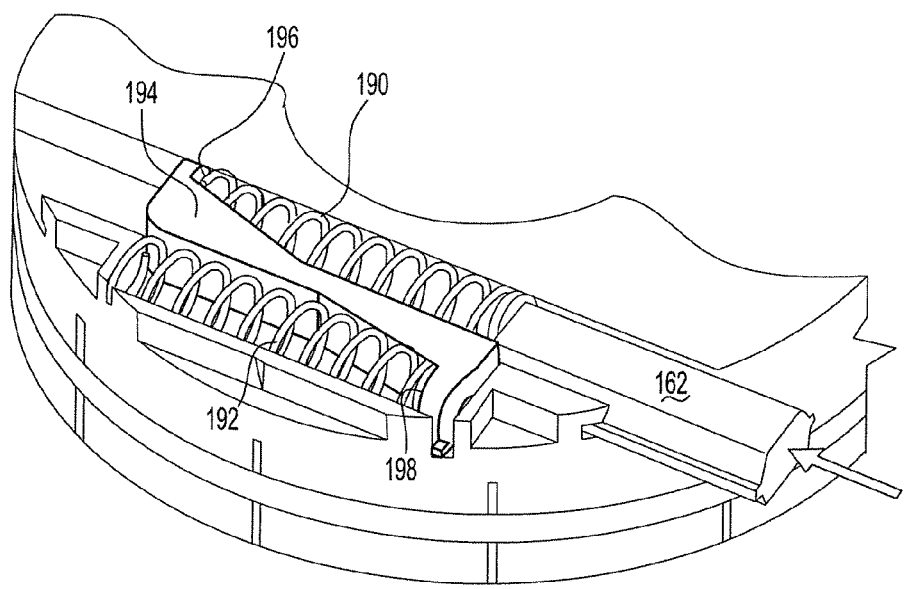
FIG. 17 illustrates a perspective view of yet another alternative embodiment utilizing a pair of springs in connection with the linear sensor.

Referring now to FIG. 17. FIG. 17 illustrates an embodiments of the embodiment illustrated in FIGS. 9, 10 and 11. Instead of utilizing a magnet connection, the system uses 2 springs 190, 192 in series to push back against the magnet 162 as the magnet is pushed by the pedal (as illustrated by the directional arrow). In the other embodiments of the present invention discussed above, the springs may linear. However, packaging demands do not always allow for the room a linear spring system requires. The springs 190, 192 being in series provides for a comparable compression distance while maintaining the small packaging size. A retainer 194 is provided holding the springs in place. The retainer 194 includes at least 2 surfaces 196, 198 where the springs can rest and compress against. As the magnet 162 moves forward, the spring 190 is compress and the retainer transfers some of that force to the second spring 192. This results in a comparable compression distances when compared to a linear spring arrangement. The assembly requires at least two springs (more springs may also be provided) in series, connected via offset spring retainer, approximately 20 mm Compression per spring required. In the present embodiments, there is a 35 mm installed height, 15 mm compressed height. In the present embodiment, springs are Titanium due to package restraints. Other materials that were investigated did not meet the cycling requirements (1.6 M cycles). Spring design can be refined moving forward if lifetime cycling pattern is more detailed. The magnet 162 communicates with the PCB and Hall effect sensors/chips contained within the housing, such as discussed above in the present embodiments.

In all embodiments discussed above, the sensors are in communication with an ECU 300 or other electronic pedal control system to provide information to the pedal system 150 (having a pivot 152, a pedal arm 154 and a pedal pad 156). Since this is an electronic system, information needs to be conveyed to the system to tell the system when to brake or accelerate.

A sensor assembly for a vehicle electronic pedal system comprising at least one linear sensor, the linear sensor adapted to measure the linear distance traveled of a pedal, a rotary sensor, the rotary sensor connected to the at least one linear sensor, the rotary sensor adapted to measure rotary motion of a DC motor in an the electronic pedal system, an encapsulation material covering both the at least one linear sensor and the rotary sensor where the rotary sensor and the at least one linear sensor each in communication with a pedal control unit (ECU).

In one embodiment, the least one linear sensor is a Hall-effect sensor, the linear sensor further includes a printed circuit board wherein a hall effect chip operable to measure linear distance traveled is mounted to the printed circuit board and is in communication with a magnet of the linear sensor. Further, the rotary sensor utilizes the same printed circuit board as the linear sensor, the printed circuit board also including an inductive sensor.

A wake up switch circuit may be integrated with at least one of the linear sensors to wake up the system when the driver depresses the pedal in the electronic pedal system.

The linear sensor and the rotary sensor may each have their own distinct printed circuit boards. In one embodiment, the rotary sensor is an inductive sensor. In one embodiment, the linear sensor connects to the pedal by means of a magnet.

A wake up switch may be provided connected to the at least one linear sensor to wake up the system when the driver depresses the pedal. A pair of springs may be provided in series to provide push back to the pedal assembly during depression of the pedal and movement of the magnet.

In another embodiment, the sensor assembly for a vehicle electronic pedal system includes a housing (such as shown in FIG. 12 where two separate sensors are connected to the overall housing), at least one linear sensor connected to the housing, the at least one linear sensor encapsulated by an encapsulation material, the linear sensor adapted to measure the linear distance traveled of a pedal, a rotary sensor also connected to the housing, the rotary sensor spaced apart from the at least one linear sensor, the rotary sensor also encapsulated by a separate encapsulation material, the rotary sensor adapted to measure rotary motion of a DC motor in an the electronic pedal system where the rotary sensor and the at least one linear sensor each in communication with a pedal control unit (ECU).

The housing may be overmolded over both the at least one linear sensor and the rotary sensor. The at least one linear sensor and the at least one rotary sensor may be encapsulated within the housing. The at least one linear sensor may be a Hall-effect sensor. A wake up switch circuit may be integrated with at least one of the linear sensors to wake up the system when the driver depresses the pedal in the electronic pedal system. The rotary sensor is an inductive sensor. The linear sensor may include at least one magnet operable to measure travel of push rod connected to a pedal. The magnets (or Hall Effect chips) are may be mounted to a PCB. The linear sensor may connect to the pedal by means of a magnet. A wake up switch may be provided connected to the at least one linear sensor to wake up the system when the driver depresses the pedal.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

The invention claimed is:

1. A sensor assembly for a vehicle electronic pedal system, the assembly comprising:
   at least one linear sensor, the linear sensor measuring the linear distance traveled of a pedal;
   a rotary sensor, the rotary sensor connected to the at least one linear sensor, the rotary sensor measuring the rotary motion of a motor; and
   the rotary sensor and the at least one linear sensor each in communication with and electrically connected to a pedal control unit (ECU), the rotary sensor and the at least one linear sensor connected to the pedal control unit (ECU) by a single connector.

2. The sensor assembly of claim 1 wherein the at least one linear sensor is a Hall-effect sensor, the linear sensor further includes a printed circuit board.

3. The sensor assembly of claim 2 wherein a hall effect chip measures linear distance traveled is mounted to the printed circuit board and is in communication with a magnet of the linear sensor.

4. The sensor assembly of claim 2 wherein the rotary sensor utilizes the same printed circuit board as the linear sensor, the printed circuit board also including an inductive sensor.

5. The sensor assembly of claim 1 wherein a wake up switch circuit is integrated with at least one of the linear sensors to wake up the system when a driver depresses a pedal in the electronic pedal system.

6. The sensor assembly of claim 1 wherein the linear sensor and the rotary sensor each have their own distinct printed circuit boards.

7. The sensor assembly of claim 1 wherein the rotary sensor is an inductive sensor.

8. The sensor assembly of claim 1 wherein the linear sensor connects to a pedal by means of a magnet.

9. The sensor assembly of claim 1 wherein a wake up switch is provided connected to the at least one linear sensor to wake up the system when the driver depresses the pedal.

10. The sensor assembly of claim 1 wherein a pair of springs are provided in series to provide push back to the pedal assembly during depression of the pedal and movement of the magnet.

11. A sensor assembly for a vehicle electronic pedal system, the assembly comprising:
    a housing;

at least one linear sensor connected to the housing, the linear sensor measuring the linear distance traveled of a pedal;

a rotary sensor also connected to the housing, the rotary sensor spaced apart from the at least one linear sensor, the rotary sensor also encapsulated by a separate encapsulation material, the rotary sensor measuring the rotary motion of a DC motor in an the electronic pedal system; and the rotary sensor and the at least one linear sensor each in communication with a pedal control unit (ECU) through a single connector.

12. The sensor assembly of claim 11 wherein the housing is overmolded over both the at least one linear sensor and the rotary sensor.

13. The sensor assembly of claim 11 wherein the at least one linear sensor and the at least one rotary sensor are encapsulated within the housing.

14. The sensor assembly of claim 11 wherein the at least one linear sensor is a Hall-effect sensor.

15. The sensor assembly of claim 11 wherein a wake up switch circuit is integrated with at least one of the linear sensors to wake up the system when a driver depresses the pedal in the electronic pedal system.

16. The sensor assembly of claim 11 wherein the rotary sensor is an inductive sensor.

17. The sensor assembly of claim 11 wherein the linear sensor includes at least one magnet measuring the travel of push rod connected to a pedal.

18. The sensor assembly of claim 17 wherein the magnets are mounted to a PCB.

19. The sensor assembly of claim 11 wherein the linear sensor connects to the pedal by means of a magnet.

20. The sensor assembly of claim 11 wherein a wake up switch is provided connected to the at least one linear sensor to wake up the system when a driver depresses the pedal.

* * * * *